United States Patent
Johnson et al.

(10) Patent No.: US 12,126,014 B2
(45) Date of Patent: Oct. 22, 2024

(54) ALKALINE ELECTROCHEMICAL CELLS COMPRISING INCREASED ZINC OXIDE LEVELS

(71) Applicant: Energizer Brands, LLC, St. Louis, MO (US)

(72) Inventors: Robert P. Johnson, Lakewood, OH (US); Robert E. Ray, Jr., Strongsville, OH (US); Weiwei Huang, Westlake, OH (US); Zhufang Liu, Westlake, OH (US); Steven J. Limmer, Cleveland, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 17/819,365

(22) Filed: Aug. 12, 2022

(65) Prior Publication Data

US 2023/0107037 A1    Apr. 6, 2023

Related U.S. Application Data

(63) Continuation of application No. 16/674,828, filed on Nov. 5, 2019, now Pat. No. 11,450,847.

(60) Provisional application No. 62/795,750, filed on Jan. 23, 2019.

(51) Int. Cl.
| | |
|---|---|
| H01M 4/36 | (2006.01) |
| H01M 4/02 | (2006.01) |
| H01M 4/38 | (2006.01) |
| H01M 4/48 | (2010.01) |
| H01M 10/26 | (2006.01) |

(52) U.S. Cl.
CPC ............. *H01M 4/364* (2013.01); *H01M 4/38* (2013.01); *H01M 4/48* (2013.01); *H01M 10/26* (2013.01); *H01M 2004/027* (2013.01); *H01M 2300/0014* (2013.01); *H01M 2300/0085* (2013.01)

(58) Field of Classification Search
CPC .......... H01M 4/364; H01M 4/38; H01M 4/48; H01M 10/26; H01M 2004/027; H01M 2300/0014; H01M 2300/0085; H01M 4/62; H01M 6/085; H01M 2220/30; H01M 6/045; H01M 4/06; H01M 4/244; Y02E 60/10

See application file for complete search history.

(56) References Cited

U.S. PATENT DOCUMENTS

| | | |
|---|---|---|
| 3,466,195 A | 9/1969 | Spellman et al. |
| 3,703,413 A | 11/1972 | Arrance |
| 3,870,564 A | 3/1975 | Takamura et al. |
| 3,923,544 A | 12/1975 | Berchielli |
| 3,923,550 A | 12/1975 | Von Krusenstierna |
| 4,005,061 A | 1/1977 | Lemaire |
| 4,015,053 A | 3/1977 | Von Krusenstierna |
| 4,091,181 A | 5/1978 | Merritt, Jr. |
| 4,180,623 A | 12/1979 | Adams |
| 4,263,383 A | 4/1981 | Coulombeau et al. |
| 4,407,915 A | 10/1983 | Brown |
| 5,208,526 A | 5/1993 | Goldman et al. |
| 5,279,743 A | 1/1994 | Ward et al. |
| 5,389,469 A | 2/1995 | Passaniti et al. |
| 5,424,145 A | 6/1995 | Tomantschger et al. |
| 5,464,709 A | 11/1995 | Getz et al. |
| 5,626,988 A | 5/1997 | Daniel-Ivad et al. |
| 5,780,994 A | 7/1998 | Sisemore |
| 6,514,637 B2 | 2/2003 | Treger et al. |
| 6,764,588 B2 | 7/2004 | Smedley et al. |
| 7,169,508 B2 | 1/2007 | Daniel-Ivad et al. |
| 7,306,822 B2 | 12/2007 | Yadav et al. |
| 8,039,150 B2 | 10/2011 | Burchardt et al. |
| 8,318,350 B2 | 11/2012 | Johnson |
| 8,586,244 B2 | 11/2013 | Fensore et al. |
| 8,865,336 B2 | 10/2014 | Hayakawa et al. |
| 8,883,346 B2 | 11/2014 | Ogg |
| 8,968,915 B2 | 3/2015 | Ogg |
| 9,029,027 B2 | 5/2015 | Friesen et al. |
| 9,040,196 B2 | 5/2015 | Kato et al. |
| 9,070,936 B2 | 6/2015 | Das et al. |
| 9,142,816 B2 | 9/2015 | Hayakawa et al. |
| 10,014,501 B2 | 7/2018 | Natesh et al. |
| 10,319,991 B2 | 6/2019 | Marple |
| 10,461,571 B2 | 10/2019 | Nakai et al. |
| 10,476,075 B2 | 11/2019 | Ono et al. |
| 10,541,450 B2 | 1/2020 | Watanabe |
| 10,804,536 B2 | 10/2020 | Schimek et al. |

(Continued)

FOREIGN PATENT DOCUMENTS

| | | |
|---|---|---|
| AU | 1974070315 A1 | 1/1976 |
| CA | 1067571 A | 12/1979 |

(Continued)

OTHER PUBLICATIONS

Anseau et al., "Interactions of Silicate Ions with Zinc(II) and Aluminum(III) in Alkaline Aqueous Solution," Inorg. Chem., 44(22):8023-8032, (2005).

(Continued)

*Primary Examiner* — Muhammad S Siddiquee

(74) *Attorney, Agent, or Firm* — Alston & Bird LLP

(57) ABSTRACT

Alkaline electrochemical cells are provided, wherein dissolved zinc oxide or zinc hydroxide is included at least in the free electrolyte solution, and/or solid zinc oxide or zinc hydroxide is included in the anode, so as to slow formation of a zinc oxide passivation layer on a zinc electrode. Methods for preparing such cells are also provided.

20 Claims, 3 Drawing Sheets

(56) References Cited

U.S. PATENT DOCUMENTS

| | | | |
|---|---|---|---|
| 10,826,060 B2 | 11/2020 | Marple | |
| 11,133,499 B2 | 9/2021 | Zheng et al. | |
| 11,322,752 B2 | 5/2022 | Huang | |
| 11,437,655 B2 | 9/2022 | Liu et al. | |
| 11,450,847 B2 | 9/2022 | Johnson et al. | |
| 2002/0068220 A1* | 6/2002 | Wyler | H01M 6/08 429/231 |
| 2004/0166412 A1 | 8/2004 | Bugnet et al. | |
| 2004/0258608 A1 | 12/2004 | Cayton et al. | |
| 2005/0064292 A1 | 3/2005 | Phillips et al. | |
| 2005/0130041 A1 | 6/2005 | Fensore, III | |
| 2006/0046135 A1 | 3/2006 | Huang | |
| 2006/0124894 A1* | 6/2006 | Daniel-Ivad | H01M 4/244 252/182.1 |
| 2008/0241683 A1* | 10/2008 | Fensore | H01M 4/06 429/212 |
| 2011/0189517 A1 | 8/2011 | Kato et al. | |
| 2014/0154542 A1 | 6/2014 | Issaev et al. | |
| 2015/0207139 A1* | 7/2015 | Hall | H01M 4/48 252/182.1 |
| 2015/0214541 A1 | 7/2015 | Bresser et al. | |
| 2015/0364789 A1 | 12/2015 | Ogawa et al. | |
| 2016/0351909 A1 | 12/2016 | Bittner et al. | |
| 2017/0237134 A1* | 8/2017 | Guha | H01M 10/4235 429/406 |
| 2017/0271679 A1* | 9/2017 | Fan | H01M 4/50 |
| 2017/0358793 A1 | 12/2017 | Marple | |
| 2018/0248231 A1 | 8/2018 | Zheng | |
| 2018/0254527 A1 | 9/2018 | Watanabe | |
| 2019/0051908 A1 | 2/2019 | Chen et al. | |
| 2019/0074499 A1 | 3/2019 | Ogawa et al. | |
| 2019/0288346 A1 | 9/2019 | Liu et al. | |
| 2020/0067100 A1 | 2/2020 | Slezak | |
| 2020/0203713 A1 | 6/2020 | Slezak | |
| 2020/0235382 A1 | 7/2020 | Johnson et al. | |
| 2020/0328411 A1 | 10/2020 | Zheng et al. | |
| 2020/0399736 A1 | 12/2020 | Joensuu et al. | |
| 2020/0411884 A1 | 12/2020 | Huang et al. | |
| 2021/0094841 A1 | 4/2021 | Zheng | |
| 2021/0119264 A1 | 4/2021 | Gibson et al. | |
| 2021/0226191 A1 | 7/2021 | Bolyos | |
| 2022/0077473 A1 | 3/2022 | Liu et al. | |
| 2022/0255068 A1 | 8/2022 | Liu et al. | |

FOREIGN PATENT DOCUMENTS

| | | |
|---|---|---|
| CA | 2389907 A1 | 12/2003 |
| DE | 1927092 B2 | 2/1973 |
| DE | 602008059545 T2 | 3/2019 |
| EP | 3540837 A1 | 9/2019 |
| FI | 63500 B | 2/1983 |
| FI | 63501 C | 6/1983 |
| FR | 2276699 A1 | 1/1976 |
| GB | 1411911 A | 10/1975 |
| GB | 1442356 A | 7/1976 |
| GB | 2054252 B | 4/1983 |
| IL | 58826 | 2/1980 |
| IN | 0397/DEL/1995 | 5/2011 |
| IN | 39/2020 | 9/2020 |
| JP | 50-031327 A | 3/1975 |
| JP | 50-031328 A | 3/1975 |
| JP | 50-072135 A | 6/1975 |
| JP | 60-056365 A | 4/1985 |
| JP | 61-143939 A | 4/1986 |
| JP | 61-273862 A | 12/1986 |
| JP | 01-134862 A | 5/1989 |
| JP | 2010-524174 A | 7/2010 |
| JP | 6284680 B2 | 2/2018 |
| JP | 2020-155372 A | 9/2020 |
| WO | WO 97/17737 A1 | 5/1997 |
| WO | WO 1999/010943 A1 | 3/1999 |
| WO | WO 2017/047628 A1 | 3/2017 |

OTHER PUBLICATIONS

Renuka et al., "Cyclic voltammetric study of zinc and zinc oxide electrodes in 5.3 M KOH," Journal of Applied Electrochemistry, 31:655-661, (2001).

Renuka et al., "Interaction of zincate with additives turbidimetric, IR and Raman spectral analyses," Journal of Power Sources, 89:70-79, (2000).

WIPO Application No. PCT/US2020/014814, PCT International Search Report and Written Opinion of the International Searching Authority mailed Jun. 19, 2020.

Zhu et al., "Increasing the Electrolyte Capacity of Alkaline Zn-Air Fuel Cells via Scavenging Zincate with Ca(OH)2," ChemElectroChem, 2(1):134-142, (2015).

E.J. Podlaha and H.Y. Cheh, "Modeling of Cylindrical Alkaline Cells," J. Electrochem. Soc., vol. 141, No. 1 (Jan. 1994).

English Translation of KR Office Action dated Oct. 20, 2023 for KR Application No. 10-2021-7025695, 6 page(s).

KR Office Action Mailed on Oct. 20, 2023 for KR Application No. 10-2021-7025695, 6 page(s).

Outgoing—ISA/210—International Search Report and Written Opinion Mailed on May 22, 2023 for WO Application No. PCT/US22/080443, 19 page(s).

US Advisory Action received for U.S. Appl. No. 16/674,828, dated Apr. 15, 2022, 4 pages.

US Final Office Action received for U.S. Appl. No. 16/674,828, dated Jan. 3, 2022, 10 pages.

US Non-Final Office Action received for U.S. Appl. No. 16/674,828, dated Jul. 22, 2021, 11 pages.

US Notice of Allowance received for U.S. Appl. No. 16/674,828, dated May 10, 2022, 8 pages.

\* cited by examiner

ALKALINE ELECTROCHEMICAL CELLS COMPRISING INCREASED ZINC OXIDE LEVELS

CROSS-REFERENCE TO RELATED APPLICATIONS

This application is a continuation of U.S. patent application Ser. No. 16/674,828, filed Nov. 5, 2019, which claims the benefit of U.S. Provisional Application No. 62/795,750, filed Jan. 23, 2019, the contents of which are hereby incorporated by reference in their entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Zinc (Zn) is a well-known substance commonly used in electrochemical cells, such as dry cell batteries, as an active anode material. During discharge of electrochemical cells, the zinc is oxidized to form zinc oxide (ZnO). This zinc oxide reaction product forms a passivation layer, which can inhibit the efficient discharge of the remaining zinc, decreasing battery performance.

It is in an effort to overcome the limitations of the above-described cells, and other such cells, that the present embodiments were designed.

BRIEF SUMMARY

An embodiment is an alkaline electrochemical cell, comprising:
a) a container; and
b) an electrode assembly disposed within the container and comprising a cathode, an anode, a separator located between the cathode and the anode, and a free electrolyte solution;
wherein the anode comprises 1) solid zinc and 2) solid zinc oxide or solid zinc hydroxide; and
wherein the free electrolyte solution comprises dissolved zinc oxide or dissolved zinc hydroxide.

DETAILED DESCRIPTION AND DISCUSSION

Figure 1:
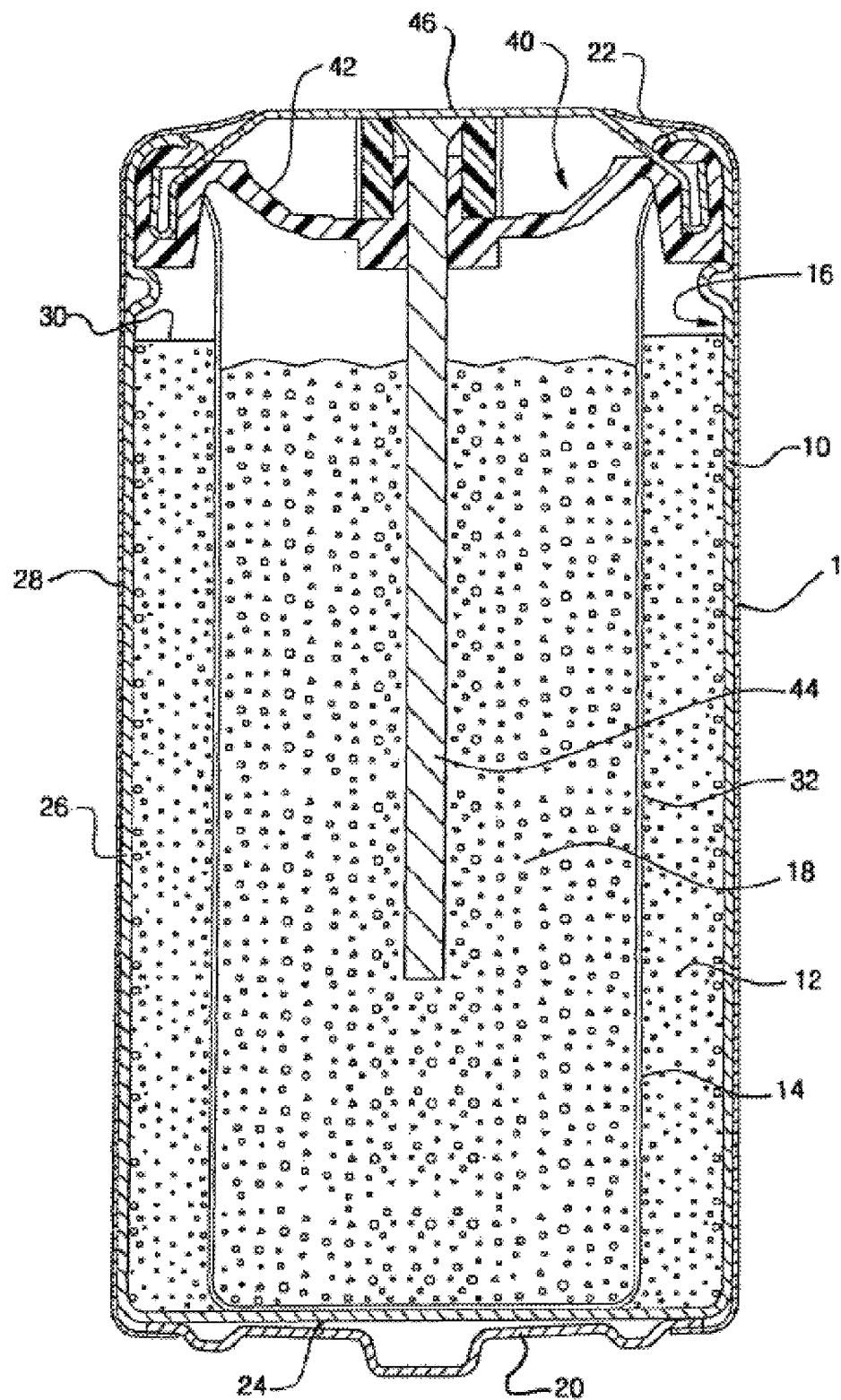
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, "full cell electrolyte mass" refers to the total mass of electrolyte in the cell, and "full cell electrolyte concentration" refers to the total concentration of electrolyte in the cell. The full cell electrolyte concentration can be found according to the calculation (full cell electrolyte mass)/(full cell electrolyte mass+total water mass in cell) multiplied by 100 if it is to be conveyed as a percentage. The total additive weight percent in the full cell electrolyte solution can be determined via the calculation (total mass of additive in cell)/(total mass of additive in cell+full cell electrolyte mass+total water mass in cell)×100.

As used herein, the "total weight percent" of a zinc compound in a cell, or portion thereof, refers to the total weight of the zinc compound, compared to the total mass or weight of the zinc compound, electrolyte, and water in the cell or portion thereof. For example, "total zinc oxide weight percent" of a cell is calculated as (zinc oxide mass)/(zinc oxide mass+electrolyte mass+water mass)×100%.

"Total dissolved zinc oxide weight percent" in the full-cell electrolyte is calculated as (dissolved zinc oxide mass in cell)/(dissolved zinc oxide mass in cell+electrolyte mass in cell+water mass in cell)×100%. This measurement does not account for the mass of solid (i.e., undissolved) zinc oxide in the anode.

As used herein, the "electrolyte concentration percent" of an electrode refers to the total weight of the electrolyte in the electrode, compared to the total weight of the electrolyte and the water in the electrode. For example the "KOH weight percent" of an electrode is calculated as (KOH mass in electrode)/(KOH mass in electrode+water mass in electrode)×100%.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

As used herein, describing a solution as "X % saturated" with a solute means that the solution comprises as a solute X % of the maximum amount of the solute that could be dissolved in the solution at the same temperature, pressure, etc, accounting for all other components of the solution (such as, for example, dissolved electrolyte).

Describing an electrochemical cell as having "X % total cell saturation" of a compound accounts for both the compound dissolved in free electrolyte solution as well as the presence of that compound in the anode. For example, in calculating the total cell saturation of zinc oxide of an electrochemical cell, the amount of zinc oxide dissolved in the free electrolyte solution would need to be determined, along with solid and dissolved zinc oxide in the anode. This may result in a total cell saturation percentage over 100%.

As used herein, a "source of zincate ions" refers to any compound which produces zincate ions ($Zn(OH)_4^{2-}$) when placed in solution. Non-limiting examples include Zn, zinc oxide (ZnO), and zinc hydroxide ($Zn(OH)_2$). In an embodiment, the term may refer to only ZnO and $Zn(OH)_2$.

An embodiment is an alkaline electrochemical cell, comprising:
a) a container; and
b) an electrode assembly disposed within the container and comprising a cathode, an anode, a separator located between the cathode and the anode, and a free electrolyte solution;
wherein the anode comprises 1) solid zinc and 2) solid zinc oxide or solid zinc hydroxide; and
wherein the free electrolyte solution comprises dissolved zinc oxide or dissolved zinc hydroxide.

In an embodiment, the anode comprises solid zinc oxide and the free electrolyte solution comprises dissolved zinc oxide.

In an embodiment, the free electrolyte solution comprises dissolved zinc oxide in an amount of greater than 2.0 weight percent. In a further embodiment, the free electrolyte solution comprises dissolved zinc oxide in an amount of about 4.0-6.5 weight percent.

In an embodiment, the anode comprises a gelled electrolyte, wherein the gelled electrolyte is prepared by combining a gelling agent with a first aqueous alkaline electrolyte solution, wherein the first aqueous alkaline electrolyte solution comprises an alkaline metal hydroxide electrolyte and dissolved zinc oxide. In a further embodiment, the first aqueous alkaline electrolyte solution comprises dissolved zinc oxide in an amount of ≥2.5, ≥2.6, ≥2.7, ≥2.8, ≥2.9, ≥3.0, ≥3.1, ≥3.2, ≥3.3, ≥3.4, ≥3.5, ≥3.6, ≥3.7, ≥3.8, ≥3.9, or ≥4.0 weight percent. In an embodiment, the first aqueous alkaline electrolyte solution comprises dissolved zinc oxide in an amount of about 2.7-3.3 weight percent.

In an embodiment, the cathode comprises a second aqueous alkaline electrolyte solution, wherein the second aqueous alkaline electrolyte solution comprises an alkaline metal hydroxide electrolyte and dissolved zinc oxide. In a further embodiment, the second aqueous alkaline electrolyte solution comprises dissolved zinc oxide in an amount of ≥2.5, ≥2.6, ≥2.7, ≥2.8, ≥2.9, ≥3.0, ≥3.1, ≥3.2, ≥3.3, ≥3.4, ≥3.5, ≥3.6, ≥3.7, ≥3.8, ≥3.9, or ≥4.0 weight percent. In a further embodiment, the second aqueous alkaline electrolyte solution comprises dissolved zinc oxide in an amount of about 2.5-4.0 weight percent, or about 2.7-3.3 weight percent.

In an embodiment, the first aqueous alkaline electrolyte solution and the second aqueous alkaline electrolyte solution are identical.

In an embodiment, the total dissolved zinc oxide weight percent in the electrochemical cell's full cell electrolyte solution is about 1.5-4.5 weight percent. In an embodiment, the total zinc oxide weight percent in the electrochemical cell's full cell electrolyte solution is about 2.0-4.0 or about 2.5-3.5 weight percent. In an embodiment, the total zinc oxide weight percent in the electrochemical cell's full cell electrolyte solution is greater than about 4.5 weight percent. In an embodiment, the total zinc oxide weight percent in the electrochemical cell's full cell electrolyte solution is about 0.5-4.5 weight percent, or about 0.5-3.0 weight percent, or about 0.5-2.0 weight percent.

In an embodiment, the electrochemical cell's full cell electrolyte is greater than 40% saturated with dissolved zinc oxide.

In an embodiment, the solid zinc oxide or solid zinc hydroxide is a substituted solid zinc oxide is substituted and comprises a cation substituent or an anion substituent, wherein the substituted solid zinc oxide or substituted solid zinc hydroxide is less soluble than unsubstituted solid zinc oxide or substituted solid zinc hydroxide.

In an embodiment, the substituted solid zinc oxide has the formula $Zn_{1-x}Y_xO$, wherein Y is at least one cation substituent, and $0<x\leq0.50$.

In an embodiment, the substituted solid zinc hydroxide has the formula $Zn_{1-x}Y_x(OH)_2$, wherein Y is at least one cation substituent, and $0<x\leq0.50$.

In an embodiment, the substituted solid zinc oxide has the formula $ZnO_{1-w}A_{(2w/z)}$, wherein A is at least one anion substituent, $0<w\leq0.50$, and z is the charge of the anion substituent.

In an embodiment, the substituted solid zinc hydroxide has the formula $Zn(OH)_{2-w}A_{(w/z)}$, wherein A is at least one anion substituent, $0<w\leq0.50$, and z is the charge of the anion substituent.

In an embodiment, the substituted solid zinc oxide has the formula $Zn_{1-x}Y_xO_{1-w}(OH)_{2w}$, wherein Y is at least one cation substituent, wherein $0<x\leq0.50$, and wherein $0<w\leq0.50$.

In an embodiment, the substituted solid zinc oxide is a cation-substituted and anion-substituted mixed oxide hydroxide. In a further embodiment, the cation-substituted and anion-substituted mixed oxide hydroxide has the formula $Zn_{1-x}Y_xO_{1-w-t}(OH)_{2w}A_{(2t/z)}$, wherein Y is at least one cation substituent, wherein $0<x\leq0.50$, wherein A is at least one anion substituent, $0<w\leq 0.50$, $0<t\leq 0.50$, and z is the charge of the anion substituent.

In an embodiment, the cation substituent is selected from the group consisting of Mg, Ca, Bi, Ba, Al, Si, Be, Cd, Ni, Co, Sn, and Sr, and any combination thereof.

In an embodiment, the anion substituent is selected from the group consisting of $CO_3^{2-}$ and $PO_4^{3-}$, and a combination thereof.

In an embodiment, the anode comprises solid zinc oxide in an amount of about 0.2 to 5 volume percent, based on the total volume of the anode. In an embodiment, the anode comprises solid zinc oxide in an amount of about 0.3 to 1.5 volume percent, based on the total volume of the anode. In an embodiment, the anode comprises solid zinc oxide in an amount of about 0.66 volume percent, based on the total volume of the anode.

In an embodiment, the alkaline electrochemical cell comprises a total zinc oxide weight percent of about 3.0-8.8%. In an embodiment, the alkaline electrochemical cell comprises a total zinc oxide weight percent of about 3.0-4.0%, about 4.0-5.0%, about 5.0-6.0%, about 6.0-7.0%, about 7.0-8.0%, and about 8.0-9.0%. In an embodiment, the alkaline electrochemical cell comprises a total zinc oxide weight percent of greater than about 3.0%. In an embodiment, the alkaline electrochemical cell comprises a total zinc oxide weight percent of greater than or equal to about 3.5%, 4.0%, 4.5%, 5.0%, 5.5%, 6.0%, 6.5%, 7.0%, 7.5%, 8.0%, and 8.5%. In an embodiment, the alkaline electrochemical cell comprises a total zinc oxide weight percent of about 4.75%.

In an embodiment, the anode comprises an electrolyte concentration percent of about 16.0-30.0%. In an embodiment, the anode comprises an electrolyte concentration percent of about 18.0-22.0%. In an embodiment, the anode comprises an electrolyte concentration percent of less than about 22.0%.

In an embodiment, the full cell electrolyte concentration is about 26.0-30.0%. In an embodiment, the full cell electrolyte concentration is less than 29.0%.

In an embodiment, the total cell saturation of zinc oxide or zinc hydroxide is at least about 40%. In an embodiment, the total cell saturation of zinc oxide or zinc hydroxide is at least about 40-125%. In an embodiment, the total cell saturation of zinc oxide or zinc hydroxide is about 40-125%. In an embodiment, the total cell saturation of zinc oxide or zinc hydroxide is at least about 40%, 45%, 50%, 55%, 60%, 70%, 75%, 80%, 85%, 90%, 95%, 100%, 105%, 110%, 115%, 120%, or 125%.

In an embodiment, the electrochemical cell is a primary cell. In an alternate embodiment, the electrochemical cell is a secondary cell.

In an embodiment, the free electrolyte solution comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$).

In an embodiment, the alkaline electrochemical cell has a specific capacity or runtime that is greater than that of a similar alkaline electrochemical cell which lacks the dissolved zinc oxide in the free electrolyte. In a further embodiment, the specific capacity or runtime is from 1% greater to 100% greater, or from 5% greater to 90% greater, or from 10% greater to 80% greater, or from 15% greater to 70% greater, or from 20% greater to 60% greater, or from 25% greater to 50% greater, or from 30% greater to 40% greater.

In an embodiment, wherein the cell has a voltage of 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6 or Nylon-6,12, an injection-moldable polymeric blend, such as polypropylene matrix combined with poly (phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of zinc (as an active material), an electrically conductive material, solid zinc oxide, and a surfactant. The negative electrode can optionally include other additives, for example a binder or a gelling agent, and the like. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore S. A., Brussels, Belgium is an example of a zinc supplier. In a preferred embodiment, the zinc powder generally has 25 to 40 percent fines less than 75 μm, and preferably 28 to 38 percent fines less than 75 μm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is present in the negative electrode. In an embodiment, the surfactant is a phosphate ester surfactant. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the adsorbed surfactant on solid zinc oxide results in enhanced surface charge density of solid zinc oxide particle surface. The higher the BET surface area of solid zinc oxide, the more surfactant can be adsorbed on the solid zinc oxide surface. In an embodiment, the surfactant concentration is about 5-50 ppm by weight, relative to the electrode active material. In an embodiment, the surfactant concentration is about 10-20 ppm.

In an embodiment, the negative electrode comprises solid zinc oxide in an amount from about 0.2 to 5 weight percent, based on the total weight of the negative electrode. In an embodiment, the negative electrode comprises solid zinc oxide in an amount from about 1 to 4 weight percent. In a preferred embodiment, the negative electrode comprises solid zinc oxide in an amount from about 0.3 to 1 weight percent. In a more preferred embodiment, the negative electrode comprises solid zinc oxide in an amount of about 0.66 weight percent.

In an embodiment, the solid zinc oxide is substituted, so as to reduce its solubility. In an embodiment, a portion of the zinc in the solid zinc oxide is substituted with another cation. In an embodiment, the substituted solid zinc oxide has the formula $Zn_{1-x}Y_xO$, wherein Y is at least one cation substituent, and $0<x\leq0.50$. In an embodiment, the cation substituent is selected from the group consisting of Mg, Ca, Bi, Ba, Al, Si, Be, Cd, Ni, Co, Sn, and Sr, and any combination thereof. In an embodiment, x is 0.01-0.40, or 0.02-0.35, or 0.4-0.30, or 0.05-0.25, or 0.10-0.20. In an embodiment, x is $\geq0.01$, $\geq0.02$, $\geq0.04$, $\geq0.06$, $\geq0.08$, $\geq0.10$, $\geq0.12$, $\geq0.14$, $\geq0.16$, $\geq0.18$, $\geq0.20$, $\geq0.25$, $\geq0.30$, $\geq0.35$, or $\geq0.40$.

In an embodiment, a portion of the oxygen in the solid zinc oxide is substituted with another anion. In an embodiment, the substituted solid zinc oxide has the formula $ZnO_{1-w}A_{(2w/z)}$, wherein A is at least one anion substituent, $0<w\leq0.50$, and z is the charge of the anion substituent. In an embodiment, the anion substituent is selected from the group consisting of $CO_3^{2-}$ and $PO_4^{3-}$, and a combination thereof. In an embodiment, w is 0.01-0.40, or 0.02-0.35, or 0.4-0.30, or 0.05-0.25, or 0.10-0.20. In an embodiment, w is $\geq0.01$, $\geq0.02$, $\geq0.04$, $\geq0.06$, $\geq0.08$, $\geq0.10$, $\geq0.12$, $\geq0.14$, $\geq0.16$, $\geq0.18$, $\geq0.20$, $\geq0.25$, $\geq0.30 \geq 0.35$, or $\geq0.40$. In an embodiment, the solid zinc oxide comprises a cation substituent and an anion substituent.

The aqueous alkaline electrolyte solution (or simply "aqueous electrolyte solution") comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 16 to about 36 weight percent, for example from about 16 to about 28 weight percent, and specifically from about 18 to about 22 weight percent, or about 20 weight percent, based on the total weight of the alkaline electrolyte solution. In an embodiment, said alkaline metal hydroxide is present in an amount from 16-36 weight percent. In an embodiment, said alkaline metal hydroxide is present in an amount greater than or equal to 16, 17, 18, 19, 20, 21, 22, 23, 24, 25, 26, 27, 28, 29, 30, 31, 32, 33, 34, 35, or 36 weight percent. In an embodiment, said alkaline metal hydroxide is present in an amount less than or equal to 16, 17, 18, 19, 20, 21, 22, 23, 24, 25, 26, 27, 28, 29, 30, 31, 32, 33, 34, 35, or 36 weight percent. In an embodiment, said alkaline metal hydroxide is present in an amount equal to about 16, 17, 18, 19, 20, 21, 22, 23, 24, 25, 26, 27, 28, 29, 30, 31, 32, 33, 34, 35, or 36 weight percent.

The aqueous alkaline electrolyte solution also comprises dissolved zinc oxide in an amount from about 1.5 to 4 weight percent, based on the total weight of the aqueous alkaline electrolyte solution.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Dissolved zinc oxide is present in the anode, preferably via dissolution in the aqueous electrolyte solution, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of 3-4 weight percent based on the total weight of the negative electrode electrolyte solution are preferred in one embodiment. In an embodiment, the dissolved zinc oxide is present in the negative electrode electrolyte solution in an amount of greater than 3 weight percent. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte solution, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode.

In addition to the aqueous alkaline electrolyte absorbed by the gelling agent during the negative electrode manufacturing process, an additional quantity of an aqueous solution of alkaline metal hydroxide, i.e., "free electrolyte," is added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 34 weight percent KOH solution is added to an LR6 type cell as free electrolyte, with about 0.87 grams added to the separator lined cavity before the negative electrode is inserted. The remaining portion of the 34 weight percent KOH solution is injected into the separator lined cavity after the negative electrode has been inserted. This free electrolyte solution comprises dissolved zinc oxide in a range of about 0.01-6.0 weight percent. In embodiments, the free electrolyte solution comprises dissolved zinc oxide in an amount of greater than, less than, or equal to about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0 weight percent, or in any range between two of these values. In a preferred embodiment, the free electrolyte solution comprises dissolved zinc oxide in an amount of between about 4.0-6.0 weight percent. The free electrolyte solution may be greater than or equal to about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% saturated with dissolved zinc oxide.

Second electrode 12, also referred to herein as the positive electrode or cathode, includes an electrochemically active material. Electrolytic manganese dioxide (EMD) is a commonly-used electrochemically active material, and is present in an amount generally from about 80 to about 92 weight percent and preferably from about 86 to 92 weight percent by weight based on the total weight of the positive electrode, i.e., EMD, conductive material, positive electrode electrolyte and additives, including organic additive(s), if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising EMD, and optionally, additive(s), and then inserting the rings into the container to form the tubular-shaped second electrode. The cell shown in FIG. 1 would typically include 3 or 4 rings.

The positive electrode can include other components such as a conductive material, for example graphite, that when mixed with the EMD provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component (such as EMD), conductive material, and barium sulfate, and optionally additive(s) are mixed together to form a homogeneous mixture. During the mixing process, an alkaline electrolyte solution, such as from about 37% to about 40% KOH solution, and optionally including organic additive(s), is evenly dispersed into the mixture thereby insuring a uniform distribution of the solution throughout the positive electrode materials. In an embodiment, the alkaline electrolyte solution used to form the cathode comprises dissolved zinc oxide, in any amount up to and including being saturated with dissolved zinc oxide. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.3:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Discussion and Examples

Discharge of zinc-based batteries involves oxidation of the zinc in the anode, resulting in the formation of zinc oxide, as mentioned previously. The zinc oxide reaction product forms a passivation layer, which inhibits the efficient discharge of the remaining zinc. By addition of dissolved ZnO (both in the free electrolyte solution and the solution comprised in the anode) and additional solid ZnO (in the anode), the reaction product is encouraged to precipitate elsewhere. Preventing the passivation layer from coating the anode allows for better utilization of the zinc. This results in a substantial improvement in the runtime on high rate tests, and specifically the Digital Still Camera (DSC) ANSI standard test.

Further, nickel metal hydride (NiMH) chargers are not intended for charging primary alkaline batteries. The charging can create an abusive condition which may cause the battery to leak. Specifically, the constant current charging will cause the decomposition of water, resulting in gas generation and increased internal pressure until the safety mechanism will vent the electrolyte. Adding a source of zincate ($Zn(OH)_4^{2-}$) allows the battery to apply the current at a voltage that prevents water decomposition, thereby delaying the likelihood of leakage. This is accomplished by the present embodiments, i.e. by saturating, or nearly saturating, the electrolyte with dissolved zinc oxide and further by adding additional zinc oxide as a solid to the anode formulation. Larger amounts of zinc oxide will further delay the potential for water decomposition.

While most of the discussion herein refers to zinc oxide being added to electrodes and electrolyte solutions, other compounds which serve as sources of zincate ions may be used instead of, or in addition to, zinc oxide. For example, the embodiments described herein may contain $Zn(OH)_2$ in the electrodes and/or electrolyte solutions instead of, or in addition to, zinc oxide.

Comparison of Surface Passivation in Anodes with and without Added Zinc Oxide

Two anodes were prepared, in order to compare the passivation in zinc oxide anodes with and without added solid zinc oxide. The compositions of the control anode and the anode of interest are shown below in Table 1.

TABLE 1

Anode and free electrolyte compositions for surface passivation comparison

| | Control | Anode of interest |
|---|---|---|
| Dissolved ZnO wt % in 28% anode KOH | 1 | 3.44 |
| Vol. % solid ZnO | 0 | 2.3 |
| ZnO wt % in surrounding free electrolyte | 0 | 5.6 |

Figure 2B:
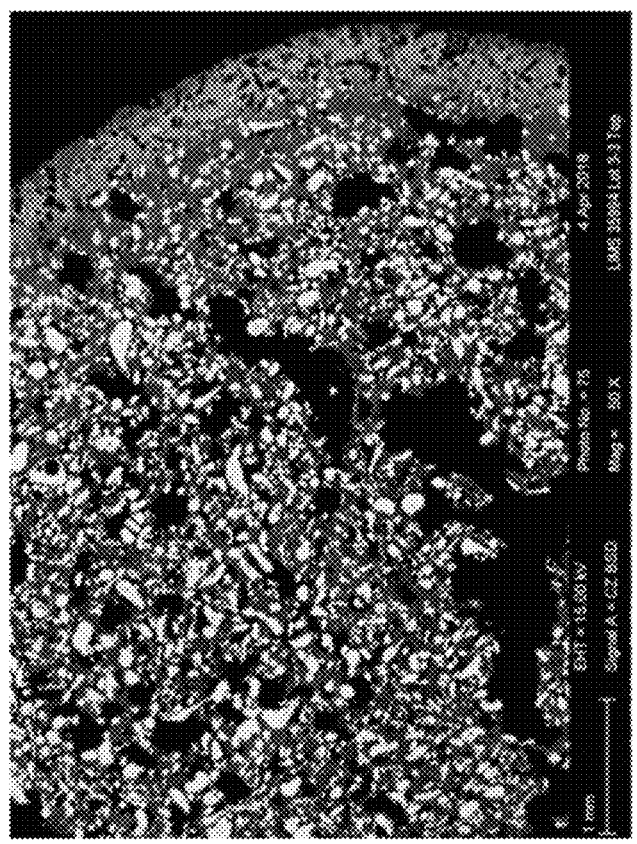
FIGS. 2A and 2B are photographs of a control anode and an anode according to an embodiment described herein, respectively.
Figure 2A:
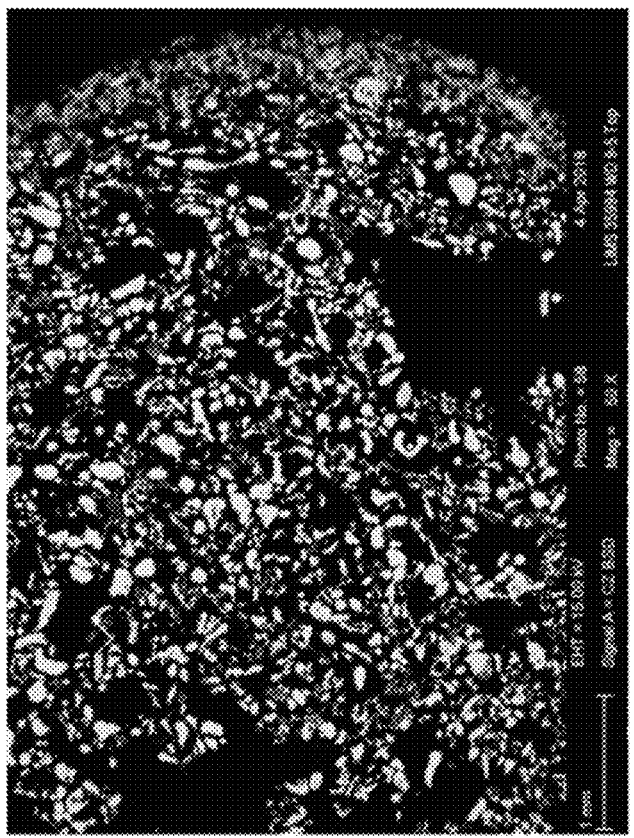

Both anodes were discharged, and the surfaces of the discharged anodes can be seen in FIGS. 2A (control anode) and 2B (anode with added zinc oxide), after 56 and 76 minutes of the Digital Still Camera (DSC) test, respectively. It is apparent that the discharge reaction and reaction product is located preferentially at the anode perimeter near the separator.

Figure 3B:
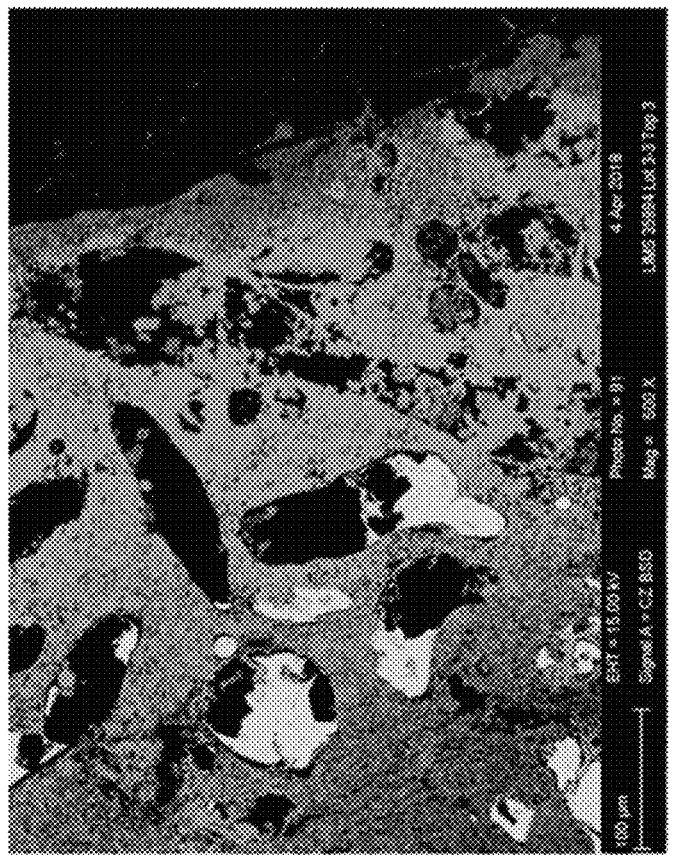
FIGS. 3A and 3B are close-ups of the photographs in FIGS. 2A and 2B, respectively.
Figure 3A:
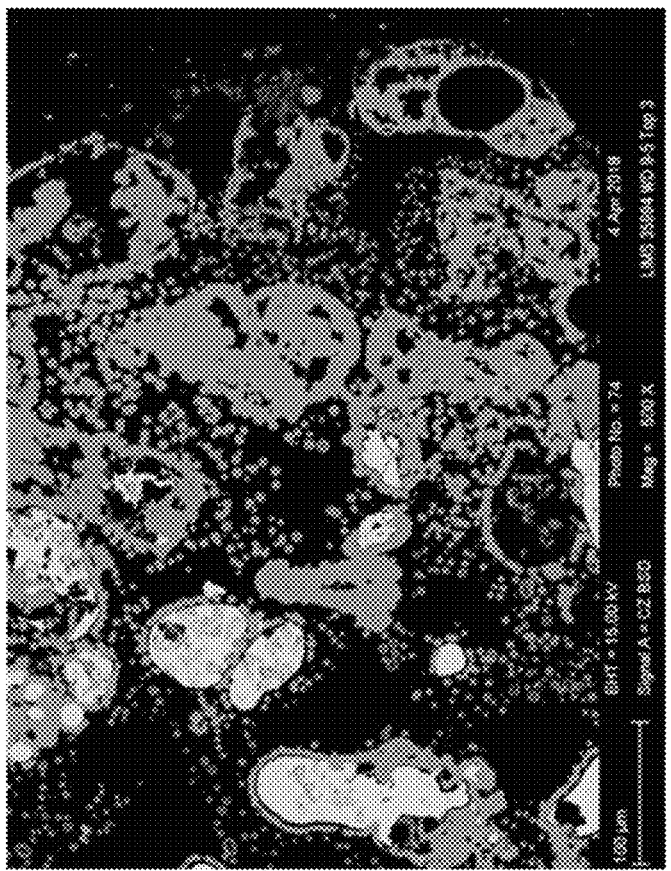

FIGS. 3A and 3B are more highly-magnified images of the reaction zones for the control anode and the anode with added zinc oxide, respectively. Under closer magnification, the zinc particles in the control are covered with ZnO (i.e., are passivated). For the anode with added solid zinc oxide, the ZnO reaction product precipitates at the nucleation site seeded by the added solid zinc oxide. The zinc surface is therefore left clean and available for discharge reaction. Higher ZnO levels and pre-saturation increases the probability for the precipitate to occur away from the zinc surface.

Digital Still Camera (DSC) Test

To test the benefits of the added solid zinc oxide to the anode and of dissolved zinc oxide to electrolyte solution, a digital still camera (DSC) test was performed on a variety of electrochemical cells. Each cell was tested to determine the amount of time it took to reduce the voltage of the cell to 1.05 V. The results are shown in Table 2, below:

TABLE 2

DSC Test Results

| Cell | Dissolved ZnO | Solid ZnO (vol. % based on anode volume) | DSC Time to 1.05 V (min) |
|---|---|---|---|
| 1 | 1 wt % based on anode weight | 0 | 59 |
| 2 | 75% saturated based on all electrolyte in cell | 0 | 64 |
| 3 | 1 wt % based on anode weight | 0.67% | 64 |
| 4 | 75% saturated based on all electrolyte in cell | 0.67% | 94 |

Adding zinc oxide to the electrolyte solution and to the anode, individually (cells 2 and 3, respectively), are shown to have a beneficial effect compared to cell 1 (containing 1 wt % ZnO in the electrolyte solution, and no added solid ZnO). However, the combination of both (in cell 4) shows a drastic increase in performance in the DSC test. The interaction of both of these added zinc oxides caused a 59% increase in the time the DSC test could be performed on the cell compared to cell 1. This result would not have been predicted by the modest benefits shown in cells 2 and 3.

Relationship Between Zinc Oxide and Potassium Hydroxide Levels and Cell Bulging

Corrosion from zinc present in electrodes can cause gassing, which increases the internal pressure of a cell. This may cause a cell to bulge and then rupture, during storage or while the cell is in use. This corrosion can also decrease runtime of a cell. Comparisons of cells with relatively high and low levels of zinc oxide, and high and low levels of anode potassium hydroxide percentages, were made in order to see how these relative levels affected the bulge of electrochemical cells. The total zinc oxide saturation percentages in the table below account for both the zinc oxide actually dissolved in the electrolyte solution, as well as solid zinc oxide in the anode, which is why the percentage may be over 100%. These cells were prepared and then stored at 80° C. for 8 weeks, to simulate an extended period of aging at room temperature. The bulge in each of the cells was observed in terms of mils ($\frac{1}{1000}$ths of an inch), as a stand-in for directly measuring the internal pressure of the cells. Results are shown in Table 3:

TABLE 3

Comparison of bulge in aged cells with varying levels of anode electrolyte concentration and cell ZnO saturation

| Total ZnO % Saturation | Anode KOH % | 80° C. Net Bulge (mils) |
|---|---|---|
| 65 | 28 | 0.9 |
| 110 | 28 | 3.8 |
| 65 | 20 | 0.3 |
| 110 | 20 | 1.7 |

The lower KOH levels resulted in decreased cell bulge, for both the higher and lower levels of ZnO. Thus, reducing KOH percentage in the anode was found to allow for increased runtime, by permitting increased levels of ZnO via mitigation of gassing issues caused by the increase.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments. For example, while this application mostly describes embodiments comprising solid and dissolved zinc oxide, similar embodiments in which all or some of the solid and/or dissolved zinc oxide is replaced by zinc hydroxide are also considered to be within the scope of the embodiments.

What is claimed is:

1. A primary alkaline electrochemical cell, comprising:
a container; and
an electrode assembly disposed within the container and comprising a cathode, an anode,
a separator located between the cathode and the anode, and a free electrolyte solution;
wherein the anode comprises 1) solid zinc, 2) solid particulate zinc oxide or solid particulate zinc hydroxide, 3) gelling agent, and 4) aqueous metal hydroxide electrolyte solution;

wherein the primary alkaline electrochemical cell comprises dissolved zinc oxide or zinc hydroxide; and wherein the primary alkaline electrochemical cell comprises a total zinc oxide or total zinc hydroxide weight percent of greater than about 2.0%.

2. The primary alkaline electrochemical cell of claim 1, wherein the primary alkaline electrochemical cell comprises a total zinc oxide or total zinc hydroxide weight percent of greater than about 4.5%.

3. The primary alkaline electrochemical cell of claim 1, wherein the total dissolved zinc oxide or zinc hydroxide weight percent in the electrochemical cell's full cell electrolyte solution is greater than or equal to about 1.5 weight percent.

4. The primary alkaline electrochemical cell of claim 1, wherein the aqueous metal hydroxide electrolyte solution comprises dissolved zinc oxide or zinc hydroxide in an amount of at least about 2.5 weight percent.

5. The primary alkaline electrochemical cell of claim 1, wherein the primary alkaline electrochemical cell comprises a total dissolved zinc oxide weight percent of greater than 2.0% and a total zinc oxide weight percent of greater than 2.1%.

6. The primary alkaline electrochemical cell of claim 1, wherein the anode comprises a zinc oxide volume percent of greater than 1.4% and the primary alkaline electrochemical cell comprises a total zinc oxide weight percent of greater than 4.0%.

7. The primary alkaline electrochemical cell of claim 1, wherein the free electrolyte solution comprises dissolved zinc oxide or zinc hydroxide in an amount of 0.1-6 weight percent.

8. The primary alkaline electrochemical cell of claim 1, wherein the primary alkaline electrochemical cell's full cell electrolyte solution is greater than 40% saturated with dissolved zinc oxide.

9. The primary alkaline electrochemical cell of claim 1, wherein the primary alkaline electrochemical cell comprises a total zinc oxide or total zinc hydroxide weight percent of greater than about 3.0%.

10. The primary alkaline electrochemical cell of claim 1, wherein the primary alkaline electrochemical cell comprises a total zinc oxide weight percent of greater than about 3.0%.

11. The primary alkaline electrochemical cell of claim 1, wherein the primary alkaline electrochemical cell comprises a total zinc oxide or total zinc hydroxide weight percent of greater than about 4.0%.

12. The primary alkaline electrochemical cell of claim 1, wherein the primary alkaline electrochemical cell comprises a total zinc oxide weight percent of greater than about 4.0%.

13. The primary alkaline electrochemical cell of claim 1, wherein the primary alkaline electrochemical cell comprises a total zinc oxide or total zinc hydroxide weight percent of greater than about 5.0%.

14. The primary alkaline electrochemical cell of claim 1, wherein the primary alkaline electrochemical cell comprises a total zinc oxide weight percent of greater than about 5.0%.

15. The primary alkaline electrochemical cell of claim 1, wherein the primary alkaline electrochemical cell comprises a total zinc oxide or total zinc hydroxide weight percent of greater than about 6.0%.

16. The primary alkaline electrochemical cell of claim 1, wherein the primary alkaline electrochemical cell comprises a total zinc oxide weight percent of greater than about 6.0%.

17. The primary alkaline electrochemical cell of claim 1, wherein the free electrolyte solution comprises dissolved zinc oxide or zinc hydroxide in an amount of 4.0-6.0 weight percent.

18. The primary alkaline electrochemical cell of claim 1, wherein the free electrolyte solution comprises dissolved zinc oxide in an amount of 4.0-6.0 weight percent.

19. The primary alkaline electrochemical cell of claim 1, wherein the free electrolyte solution comprises dissolved zinc oxide or zinc hydroxide in an amount of 1.0-5.0 weight percent.

20. The primary alkaline electrochemical cell of claim 1, wherein the free electrolyte solution comprises dissolved zinc oxide in an amount of 1.0-5.0 weight percent.

* * * * *